United States Patent [19]

Essery

[11] 3,928,337
[45] Dec. 23, 1975

[54] PROCESS FOR THE PRODUCTION OF CEFAMANDOLE

[75] Inventor: John Michael Essery, Fayetteville, N.Y.

[73] Assignee: Bristol-Myers Company, New York, N.Y.

[22] Filed: Aug. 7, 1974

[21] Appl. No.: 495,343

[52] U.S. Cl............................ 260/243 C; 424/246
[51] Int. Cl.². ...................................... C07D 501/22
[58] Field of Search ............................... 260/243 C

[56] References Cited
UNITED STATES PATENTS

| | | | |
|---|---|---|---|
| 3,840,531 | 10/1974 | Greene............................ | 260/243 C |
| 3,855,213 | 12/1974 | Dunn et al. .................... | 260/243 C |

OTHER PUBLICATIONS
Cagliotti et al., J. Org. Chem. Vol. 33, No. 7, pp. 2979–2981, (1968).

*Primary Examiner*—Nicholas S. Rizzo
*Attorney, Agent, or Firm*—Herbert W. Taylor, Jr.

[57] ABSTRACT

Cefamandole is produced by the consecutive steps of
a. mixing substantially equimolar weights of phosphonitrilic chloride trimer and of a derivative of D-mandelic acid having the formula

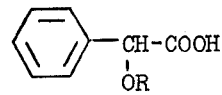

wherein the hydroxyl blocking group R represents dichloroacetyl, silyl, tetrahydropyranyl or formyl in an organic solvent;
b. adding thereto, preferably slowly, a solution containing substantially the same number of moles of 7-amino-3-(1-methyltetrazol-5-yl)thiomethyl-3-cephem-4-carboxylic acid or a salt or an easily hydrolyzed Schiff base thereof to produce the intermediate acid having the formula

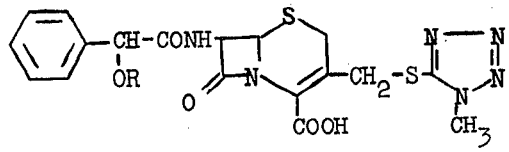

or a salt thereof and
c. removing said hydroxyl blocking group R by conventional chemical methods to produce said cefamandole or salt thereof.

1 Claim, No Drawings

PROCESS FOR THE PRODUCTION OF CEFAMANDOLE

BACKGROUND OF THE INVENTION

1. Field of the Invention

This invention relates to a chemical process for the production of the antibacterial agent cefamandole which is a known member of the cephalosporin family.

2. Description of the Prior Art

Cefamandole has the structure

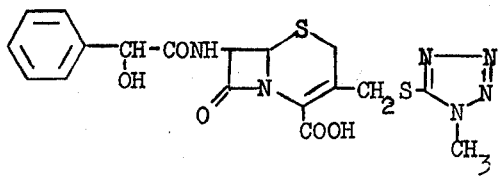

having the D configuration in the 7-sidechain. It has been reported, for example, (as "CMT") by Wick et al., Antimicrobial Ag. Chemo. 1(3), 221–234 (1972), by Ryan in Example 4 of U.S. Pat. No. 3,641,021, by Greene in France 73.10112 (corresponding to Farmdoc 60,837U, Netherlands 7303917, South Africa 73/1644) and by Guarini as Example 1 in U.S. Pat. No. 3,796,801.

The use of phosphonitrilic chloride as a coupling agent in the formation of simple amides has been reported by Caglioti et al., J. Org. Chem. 33(7), 2979–2781 (1968).

SUMMARY OF THE INVENTION

There is provided by the present invention the process for the preparation of the compound cefamandole having the D-configuration in the sidechain and the formula

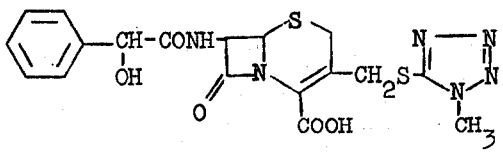

or a salt thereof which comprises the consecutive steps of a. mixing substantially equimolar weights of phosphonitrilic chloride trimer and of a derivative of D-mandelic acid having the formula

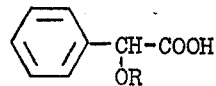

wherein the hydroxyl blocking group R represents dichloroacetyl, silyl and preferably trimethylsilyl, tetrahydropyranyl or, preferably, formyl in an anhydrous organic solvent such as benzene, ethanol or preferably tetrahydrofuran, at room temperature or below and preferably at about 5° C. for a short period of time;

b. adding thereto, preferably slowly, a solution at about the same temperature in a solvent, preferably aqueous tetrahydrofuran, containing substantially the same number of moles of a tertiary amine, preferably a tertiary alkylamine such as triethylamine and substantially the same number of moles of 7-amino-3-(1-methyltetrazol-5-yl)thiomethyl-3-cephem-4-carboxylic acid or a salt or an easily hydrolyzed Schiff base, as with benzaldehyde, thereof to produce the intermediate acid having the formula

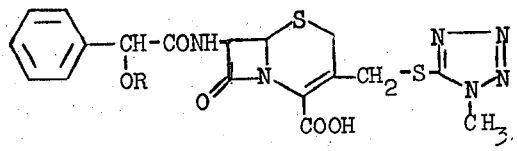

or a salt thereof wherein R has the meaning set out above; and c. removing said hydroxyl blocking group R by conventional chemical methods to produce said cefamandole or salt thereof.

In preferred embodiments of the present invention R represents formyl which is removed in step C by treatment with aqueous alkali such as aqueous sodium bicarbonate or R represents dichloroacetyl which is removed in step C by alkaline hydrolysis, preferably at about pH 9–10, or R represents trimethylsilyl which is removed in step C by exposure to aqueous acid.

This example is given in illustration of, but not in limitation of, the present invention. All temperatures are in degrees Centigrade.

DESCRIPTION OF THE PREFERRED EMBODIMENT

EXAMPLE

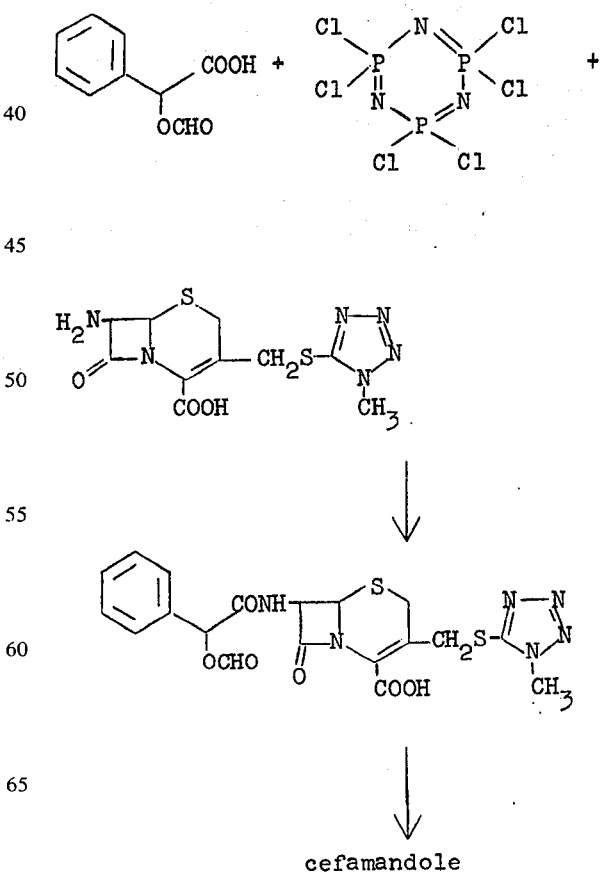

cefamandole

7-(D-α-Hydroxyphenylacetamido)-3-(1-methyltetrazol-5-yl)thiomethyl-3-cephem-4-carboxylic acid, sodium salt To a stirred solution of 1.80 g. (0.01 mole) of D-(-)-O-formylmandelic acid and 1.01 g. (0.01 mole) of triethylamine in 20 ml. of dry tetrahydrofuran was added 3.48 g. (0.01 mole) of phosphonitrilic chloride trimer (Ventron Corporation). The resulting slurry was stirred for 10 min. at room temperature. To it was added a cold (5°) solution of 3.28 g. (0.01 mole) of 7-amino-3-(1-methyltetrazol-5-yl)-thiomethyl-3-cephem-4-carboxylic acid and 1.01 g. (0.01 mole) of triethylamine in 50 ml. of 50% aqueous tetrahydrofuran. The mixture was stirred for 1 hr. at room temperature and was then filtered through diatomaceous earth. The tetrahydrofuran was removed from the filtrate under reduced pressure, and the aqueous residue (which was now at pH 1.5) was extracted with 3 × 50 ml. portions of ethyl acetate. These extracts were combined, washed with 20 ml. of water, dried over anhydrous magnesium sulfate and then evaporated to dryness under reduced pressure. The resulting 4.7 g. of yellow foam was dissolved in 60 ml. of water containing 5.0 g. of sodium bicarbonate and the yellow solution was stirred for 3 hr. at room temperature. After acidification to pH 2.5 with 6 N hydrochloric acid, the solution was extracted with 2 × 50 ml. of ethyl acetate. The combined extracts were washed with 20 ml. of water, dried over anhydrous magnesium sulfate and evaporated to dryness under reduced pressure. The residual foam was dissolved in 60 ml. of absolute ethanol and, after filtration, the filtrate was treated with a solution of 1.36 g. (.01 mole) of sodium acetate trihydrate in 6 ml. of absolute methanol. The product was collected by filtration, washed with absolute ethanol and dried in vacuo to provide 1.31 g., 29% of the title compound. Infrared and NMR spectra indicated the product to be sodium cefamandole containing a small amount of sodium acetate.

I claim:
1. The process for the preparation of the compound cefamandole having the D-configuration in the side-chain and the formula

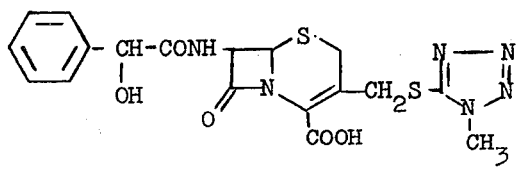

which comprises the consecutive steps of
a. mixing substantially equimolar weights of phosphonitrilic chloride trimer and of a derivative of D-mandelic acid having the formula

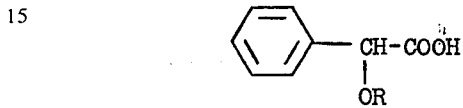

wherein the hydroxyl blocking group R represents dichloroacetyl or formyl in anhydrous tetrahydrofuran at room temperature or below for a short period of time;
b. adding slowly thereto a solution at about the same temperature in aqueous tetrahydrofuran containing substantially the same number of moles of triethylamine as a tertiary amine and substantially the same number of moles of 7-amino-3-(1-methyltetrazol-5-yl)thiomethyl-3-cephem-4-carboxylic acid to produce the intermediate acid having the formula

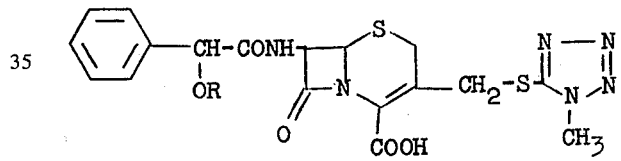

thereof wherein R has the meaning set out above; and
c. removing said hydroxyl blocking group R by reaction with aqueous sodium bicarbonate to produce said cefamandole.

* * * * *